Figure 1:
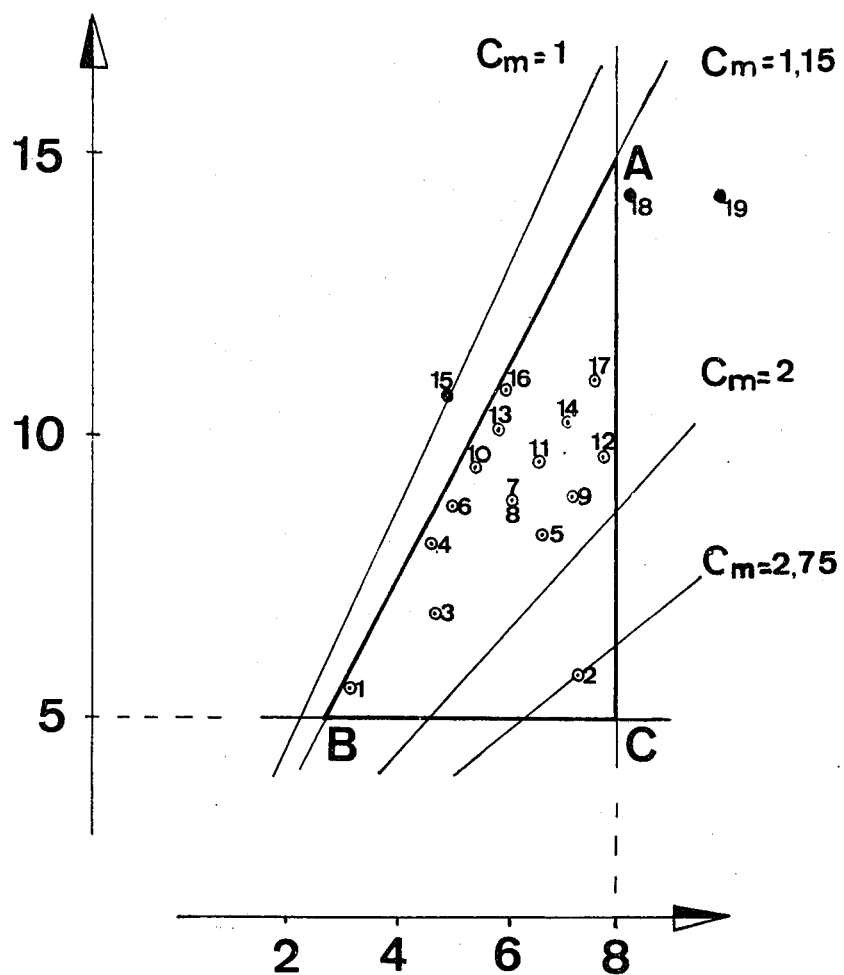

United States Patent [19]

Rochina et al.

[11] 4,297,479
[45] Oct. 27, 1981

[54] PROCESS FOR THE CONTINUOUS PRODUCTION OF AROMATIC POLYAMIDES IN A MIXTURE OF CALCIUM CHLORIDE AND N-METHYLPYRROLIDONE-2

[75] Inventors: Vincent Rochina, L'Arbresle; Jean Sacco, Lyons, both of France

[73] Assignee: Rhone-Poulenc-Textile, Paris, France

[21] Appl. No.: 897,500

[22] Filed: Apr. 18, 1978

[30] Foreign Application Priority Data

Apr. 27, 1977 [FR] France ............................ 77 13619
Feb. 20, 1978 [FR] France ............................ 78 05000

[51] Int. Cl.³ .......................................... C08G 69/28
[52] U.S. Cl. .................... 528/336; 528/312; 528/319; 528/331; 528/335; 528/338; 528/339; 528/347; 528/348
[58] Field of Search ...................... 528/336, 335, 348

[56] References Cited

U.S. PATENT DOCUMENTS

| 3,671,542 | 6/1972 | Kwolek ............................ 528/348 |
| 3,850,888 | 11/1974 | Fitzgerald et al. ............... 260/78 R |
| 3,966,686 | 6/1976 | Asakura et al. .................. 260/78 R |
| 4,075,172 | 2/1978 | Ozawa ............................. 528/348 |
| 4,172,938 | 10/1979 | Mera et al. ........................ 528/348 |

FOREIGN PATENT DOCUMENTS 157327 8/1976 Netherlands .
1547802 6/1979 United Kingdom .

OTHER PUBLICATIONS

Fiber Forming Aromatic Polyamides, Man Made Fibers, Black et al., vol. 2, (1968), p. 301.

Polymer Science (USSR), 12, #10-12 (1970), pp. 2475-2491, Federov et al.
Polymery, (1971), 16 (11), pp. 514-515, Chodkowski et al.

*Primary Examiner*—Harold D. Anderson
*Attorney, Agent, or Firm*—Stevens, Davis, Miller & Mosher

[57] ABSTRACT

A continuous process is disclosed for the production of poly-(para-phenylene terephthalamide) and its copolymers, having an inherent viscosity of at least 3. Molten terephthaloyl chloride, and optionally adipoyl chloride, are reacted in stoichiometric amounts with a solution of para-phenylenediamine and/or of 4,4'-diaminoadipanilide, and optionally of a prepolymer formed from at least one chloride and at least one diamine from amongst those mentioned above, in a mixture of N-methylpyrrolidone-2 and calcium chloride which is homogeneous and substantially anhydrous, with a molar ratio of CaCl$_2$/unit:

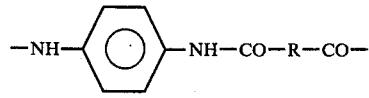

of at least 1, and preferably at least 1.15, and under conditions such that the final composition contains at least 5% by weight of polymer, relative to the N-methylpyrrolidone-2, where R represents p-phenylene or p-phenylene and up to 50% of n-butylene of the total polymer units. The polymer obtained may be converted into films, fibers and high-performance yarns for reinforcing composite materials or articles made of rubber.

8 Claims, 2 Drawing Figures

PROCESS FOR THE CONTINUOUS PRODUCTION OF AROMATIC POLYAMIDES IN A MIXTURE OF CALCIUM CHLORIDE AND N-METHYLPYRROLIDONE-2

This invention relates to a new process for the continuous production of poly-(para-phenylene terephthalamide) and its copolymers having a high inherent viscosity.

French Pat. No. 2,010,753 (for a corresponding or related U.S. patent, see U.S. Pat. No. 3,671,542) discloses anisotropic compositions of aromatic polyamides of the poly-(para-phenylene terephthalamide) type, having an inherent viscosity which is generally greater than 1, and of liquids which, besides sulphuric acid and hydrofluoric acid, may be various amides and ureas, especially dimethylacetamide (DMAC), N-methylpyrrolidone-2 (NMP), hexamethylphosphotriamide (HMPT), and tetramethylurea (TMU). Salts such as lithium chloride or calcium chloride may be added to the amides and ureas. In this patent, the preparation of poly-(para-phenylene terephthalamide) (PPD-T) in a mixture of HMPT and NMP in the ratio of ½ by weight is recommended. However, it is now known that HMPT constitutes a dangerous product by virtue of its carcinogenic properties, with the result that its use requires very great precautions, which enormously complicates the process. This patent does indeed mention the possibility of preparing other aromatic polymers in situ in the solvent of the compositions to be spun. This is the case, for example, with poly-(para-benzamide), of which the preparation in TMU is terminated in the presence of LiCl which is produced by the neutralization with lithium carbonate of the HCl formed. However, this process leads to low viscosity polymers. It is also the case with the preparation of poly-(chloro-p-phenylene terephthalamide) in a mixture of DMAC and 1% of LiCl, but this polymer is much more soluble than PPD-T.

Moreover, for the production of high viscosity PPD-T, more recent patents only recommend the use of organic solvents such as a mixture of HMPT/NMP, according to French patent application No. 2,134,582, published in 1972, and even pure HMPT, as in U.S. Pat. No. 3,850,888.

A. A. FERODOV, V. M. SAVINOV and L. B. SOKOLOV, Pol. Science USSR, 12, No. 10 (1970), describe the production of PPD-T in mixtures of various solvents, namely, NMP, DMAC, HMPT and TMU, with lithium bromide or chloride. However, the inherent viscosity of the polymers obtained is always low and does not exceed 2.6 after aging for 3 hours.

E. CHODKOWSKI, J. MACKOWIAK, W. KOZLOWSKI and H. ORZECHOWSKA, Polimery, 1971, pp. 514–15, describe the production of PPD-T in mixtures of DMAC with lithium chloride, lithium bromide or calcium chloride. The viscosity of the polymers obtained is again rather low in this case.

French patent application No. 2,301,548, published on Sept. 17, 1976, describes the preparation of PPD-T having an inherent viscosity of at least 2.5 (measured at 25° C. on a solution containing 0.5% by weight of PPD-T in 100 ml of sulphuric acid of 96% strength by weight), by reacting p-phenylenediamine with terephthaloyl chloride in a mixture of NMP and calcium chloride, the latter being present in a proportion of at least 5% relative to the NMP, but preferably in a greater proportion, and being beyond the limit of solubility so that it remains in suspension, and even in an amount by weight which is at least equal to the amount by weight of PPD-T formed, if it is desired to obtain high viscosity values. Such a process, which recommends and exemplifies the use of a large amount of calcium chloride, appears expensive and difficult to carry out industrially, especially by a continuous process. In particular, a process of this type, using such large amounts of calcium chloride which is well known for its hygroscopicity, may, when employed industrially, lead to considerable difficulties in the dehydration, handling, recovery, regeneration and treatment of the effluents.

The present invention relates to a process for the continuous production of a polyamide of the generic formula:

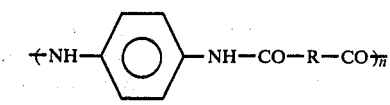

in which 50 to 100% of the radicals R are p-phenylene radicals and 0 to 50% are n-butylene radicals, which polyamide has an inherent viscosity of at least 3 (measured at 25° C. on a solution in 100% strength sulphuric acid which has a concentration of 0.5 g of polymer in 100 ml of solution).

The process is characterized in that molten terephthaloyl chloride, and optionally adipoyl chloride, are reacted continuously with a solution of para-phenylenediamine and/or of 4,4'-diaminoadipanilide, and optionally of a prepolymer formed from at least one chloride and at least one diamine from amongst those just mentioned, in a mixture of N-methylpyrrolidone-2 and calcium chloride, under conditions such that:
  the acid chloride or chlorides and the diamine or diamines are in essentially stoichiometric proportions;
  the solution of diamine, and optionally of prepolymer, in the mixture of N-methylpyrrolidone-2 and calcium chloride is homogeneous and substantially anhydrous;
  the molar ratio of calcium chloride to the number of units:

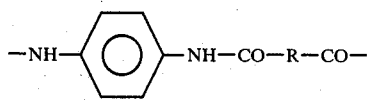

is at least 1, and preferably at least 1.15; and
  the relative amounts of reactants and solvents are chosen such that, at the end of the reaction, the composition obtained possesses at least 5% by weight of polyamide, relative to the N-methylpyrrolidone-2.

When it is desired to obtain the copolymer poly-(para-phenylene terephthalamide/adipamide), one may either react terephthaloyl chloride and adipoyl chloride with a solution of para-phenylenediamine or react terephthaloyl chloride with a solution of 4,4'-diaminoadipanilide by itself or mixed with para-phenylenediamine, or else react the chlorides with a solution of a mixture of the diamines. The chlorides may be injected either simultaneously, as a mixture, or separately, or successively.

Whether it is the PPD-T homopolymer or a copolymer which is to be obtained, one may also react the chloride or chlorides with a prepolymer formed from at least one chloride and at least one diamine from amongst those mentioned above and mixed with at least one diamine.

The solution of diamine in the mixture of NMP and $CaCl_2$ must be homogeneous; that is to say that, in particular, it must not at the time of its use (i.e., the time of reaction of the diamine present in the solution with the dichloride) contain any calcium chloride by itself or complexed in suspension which would disturb the uniformity of feed of the solution, that is to say of the running and reliability of the process and, consequently, the uniformity of viscosity of the polymer obtained, thus destroying the whole value of the continuous process of this invention. In order to achieve the desired objective, the concentration by weight of calcium chloride in the NMP must not exceed about 6 to 8%, the limit of solubility varying as a function of the water content and the temperature of the diamine solution, the nature and amount of the diamine, the dissolution process (in particular, time and temperature), and the form of the calcium chloride used (powder, chips or crystals).

The solution of diamine in the mixture of NMP and $CaCl_2$ must be substantially anhydrous, that is to say that its water content must not exceed 1,500 ppm, but it is generally preferred not to exceed 1,000, and preferably 500 or even 200 ppm by weight of water.

Part of the chloride or chlorides may be introduced, whilst stirring, into the diamine solution, in order to obtain a solution of diamine and of prepolymer. After cooling and storage, if necessary, for several days in the absence of light, this solution is reacted continuously with the remainder of the chloride or chlorides which makes up the desired stoichiometry.

For greater convenience, the term "dichloride" will be used in the following text to denote both terephthaloyl chloride by itself and its mixture with adipoyl chloride. Likewise, the term "diamine" will be used to denote both para-phenylenediamine and 4,4'-diaminoadipanilide or their mixtures, when they are by themselves or when they are combined together in the prepolymer.

In order to carry out the process according to the present invention, it is very important that the prescribed stoichiometry of the dichloride and the diamine should be observed in order to obtain a high viscosity. Care must therefore be taken to ensure a perfectly precise and uniform injection of the dichloride and of the diamine solution. Finally, since a large and essential part of the reaction of the dichloride with the diamine is extremely rapid—of the order of seconds—the initial micro-mixing thereof must be carried out instantaneously or almost instantaneously, which involves very efficient injection and stirring technology.

The temperature of the acid dichloride must be sufficient for the latter to be in the liquid state, but it must not be too high in order to prevent overheating the reaction mixture and thus run the risk of degrading it. Thus, adipoyl chloride may be used at ordinary temperature or at a lower temperature, whereas a temperature of between 85° and 120° C. is generally preferred for terephthaloyl chloride. When the two chlorides are mixed together before being injected into the diamine solution, a temperature of between 60° and 120° C. may be used.

The temperature of the diamine solution, which is generally between 0° and 50° C., may be varied in accordance with the molar ratio of $CaCl_2$/para-phenylene carboxamide unit chosen. One may also operate at temperatures above 50° C., or even below 0° C., as long as the diamine solution does not crystallize.

The molar ratio of calcium chloride to the number of units:

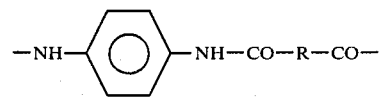

must be at least 1, in particular for the copolymers; however, for pure PPD-T, it must be at least 1.15. Particularly valuable results are obtained for a molar ratio between 1.25 and 2.75.

For technical and economic reasons, the relative amounts of reactants and solvents are chosen in such a way that, at the end of the reaction, the composition obtained possesses at least 5% by weight of polyamide, relative to the MNP. Particularly valuable results are obtained for concentrations of between 6 and 10%.

The initial injection temperature of the solution of NMP, $CaCl_2$, and diamine must be compatible with the solubility of the constituents, before and after the reactants are mixed, and it must be decreased as the concentration of polymer in the final composition increases and/or as the concentration of calcium chloride decreases.

Since the initial micro-mixing of the dichloride with the diamine solution must be instantaneous or almost instantaneous, it is appropriate to use an extremely efficient mixing apparatus equipped with very precise devices for injecting the reactants. It is possible to use, for example, a device of the type of a rotor which rotates at high speed in a fixed container and leaves only a very small clearance for the passage of the material between the rotor and the stator, in order to ensure very efficient and rapid mixing during the very first seconds of the reaction. After this first part of the equipment, which does not need to have a very large volume in order to ensure a residence time of the order of seconds, the material passes into a second part, in which the malaxating of the material is continued, but more slowly, for example in equipment comprising one or more screws.

In the case where it is desired to prepare a copolymer, one may also provide a supplementary injection device for one of the dichlorides, which device will be situated near the two devices for injecting the other reactants and optionally slightly downstream relative to the latter.

One may also use still other equipment than that described above, provided that they are sufficiently efficient to ensure a virtually instantaneous initial micro-mixing of the reactants.

The continuous process according to the present invention makes it possible to obtain, with very high uniformity, a PPD-T, or its copolymers derived from adipic acid, having an inherent viscosity (measured, as stated above, in 100% strength $H_2SO_4$) which is at least 3, generally greater than 4, and may even reach 6.5 to 7 and above.

The production of such high viscosities by a continuous process and for the above-mentioned concentrations of polymers is all the more suprising because hitherto such a level had only been reached by a continuous process in a pure HMPT medium (U.S. Pat. No. 3,850,888).

These good results of the process according to the present invention are, moreover, even more surprising because they are obtained with calcium chloride concentrations which do not exceed the limit of solubility of the latter in the solution of NMP and diamine, whereas French Application No. 2,301,548 informs and exemplifies that the highest values of the inherent viscosity of PPD-T are obtained when part of the calcium chloride is in the solid phase at the start of the reaction and, in particular, when the amount of weight of calcium chloride is at least equal to that of the polymer. In addition, these results are all the more remarkable because the process according to the present invention leads, for a PPD-T, to viscosities which may reach 6.5-7, and even more than 8 (measured in 100% strength $H_2SO_4$), whereas according to French Application No. 2,301,548, a single experiment leads, by a discontinuous process, to an inherent viscosity of 5.40 (measured in 96% strength $H_2SO_4$), which corresponds to 6.35 (measured in 100% strength $H_2SO_4$), whereas the best viscosities are obtained for 7 to 8% of polymer/NMP and a molar ratio of $CaCl_2$/p-phenylene terephthalamide unit of 3.60 to 3.76 (concentration of $CaCl_2$/NMP of 12 to 14%), which is enormous, all the other results, still according to the said French application, being distinctly inferior.

Relative to the known continuous process which has hitherto used HMPT, the process according to the present invention has a very distinct industrial value from the various points of view of economy, hygiene and safety, because it does not present any toxicological danger and, for this reason, does not require any special precautions which may be detrimental to both the technical nature and the economy of the process. In addition, since NMP is more stable than HMPT with respect to hydrolysis and thermolysis reactions, only very small amounts of it are lost during the recovery processes.

Compared with the process of French Application No. 2,301,548, the process according to the present invention is very valuable both from the technical point of view and from the economic point of view, by virtue of the small amounts of $CaCl_2$ employed, which greatly facilitates the operations of dehydrating, handling, recovering, regenerating and treating the effluents.

The attached FIG. 1 shows a graph which gives, on the abscissa, the ratio of calcium chloride/NMP, expressed in % by weight: $CaCl_2$/NMP %; on the ordinate, the ratio of PPD-T/NMP, expressed in % by weight: PPD-T/NMP %; and in oblique lines, the curves corresponding to various ratios: $C_m$ = mols $CaCl_2$/para-phenylene terephthalamide unit.

On this graph, the triangle ABC defines the area corresponding to the process according to the present invention, which makes it possible to obtain a polymer having an inherent viscosity greater than 3. The segment AB is on the curve which corresponds to a molar ratio of $CaCl_2$/p-phenylene terephthalamide unit of 1.15. The segment BC is on the line representing 5% by weight of polymer relative to the NMP. The segment AC is situated on the line of the limit of solubility of the calcium chloride in the diamine solution. In FIG. 1, this segment is drawn at 8% of $CaCl_2$/NMP, which is generally considered as a maximum and may be unsuitable under certain operating conditions, and in particular when the temperature of the diamine solution is very low and/or when the medium is very anhydrous.

The numbered points marked on this graph represent different experiments which have been carried out and are described in the correspondingly numbered examples below.

Figure 2:
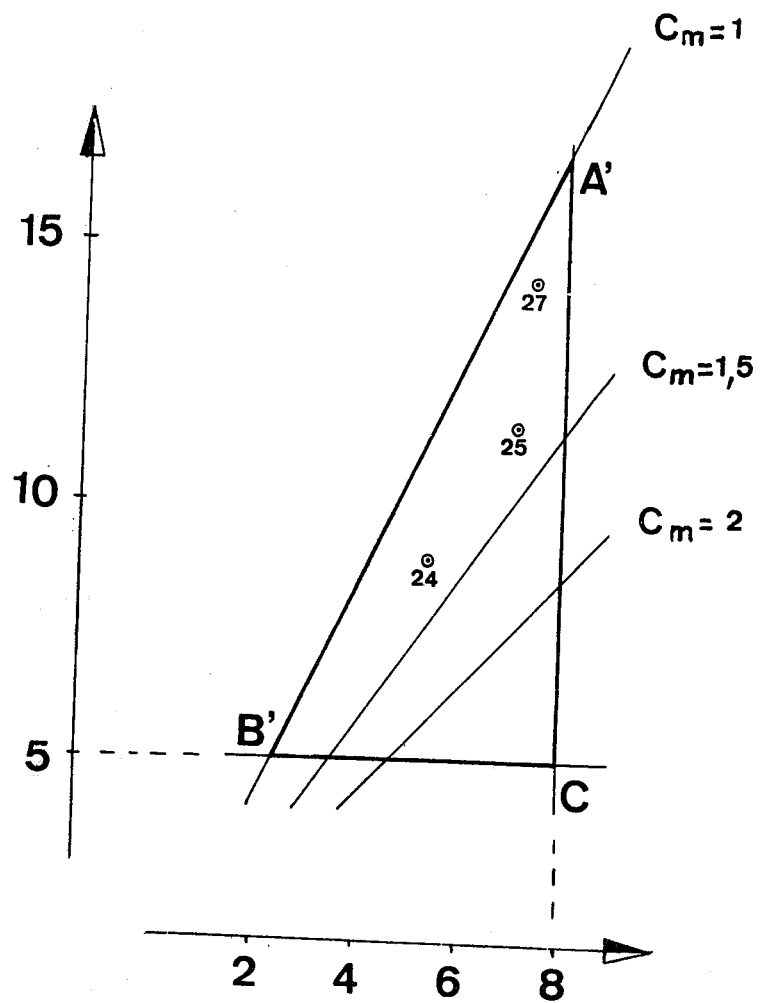

FIG. 2 is similar to FIG. 1, but it relates to a copolymer containing 14% of p-phenylene adipamide units, the ratio $C_m$ then being equal to: mols $CaCl_2$/mean copolymer unit, and the ordinate showing the ratio of copolymer/NMP, expressed in % by weight.

In FIG. 2, the triangle A'B'C defines the area corresponding to the process according to the present invention, which makes it possible to obtain a copolymer having an inherent viscosity greater than 3. The segment A'B' is on the curve corresponding to the molar ratio of $CaCl_2$/mean polymer unit of 1.0. The segments B'C and A'C are situated in the same manner as BC and AC in FIG. 1.

The polyamides obtained according to the present invention may be used for the manufacture of shaped articles, such as films, yarns and high-performance fibers; for example, by dissolving the precipitated polymer in a sulphuric acid solvent and spinning or forming a film or fiber by per se known means. The articles thus obtained may be used, for example, as a reinforcement in composite structures or in rubber articles such as tires, belts, bands, and the like.

The following examples, in which the parts are by weight, are given merely by way of description in order to illustrate the invention without in any way limiting it.

In these examples, the inherent viscosity is calculated using the following expression:

$$I.V. = \frac{\ln \eta \text{ relative}}{C}$$

in which C is the concentration in weight per volume, expressed in g per 100 ml, the relative viscosity being measured at 25° C. on a solution in 100% strength sulphuric acid which has a concentration of 0.5 g of polymer in 100 ml of solvent.

The water content of the solvents and solutions is measured coulometrically.

The weight average molecular weights $M_w$ were determined by light scattering, under the following experimental conditions:

Removal of dust from the solutions (concentrations of between 0.04 and 0.20% in weight per volume) and from the sulphuric acid used as the solvent (96% strength analytical quality PROLABO NORMAPUR) by centrifugation at 25,000 G for 4 hours;

Measurements carried out at ambient temperature on a FICA 50 apparatus equipped with a mercury vapor lamp as a source of light, using a 0.546 μm anti-fluorescent filter on the scattered beam. (Standard: double-distilled benzene, incident beam: 0.546 μm natural light). The measurements of the intensity of the scattered light are carried out at intervals of 7.5° or 15° between 30° and 150°, the vertical and horizontal components being determined at 90°.

The measurements are utilized by means of the satisfactory ZIMM diagrams obtained, by a double extrapolation to zero concentration and to zero angle of observation, and by determining the depolarization ratio at zero concentration and calculating the CABANNES correction factor.

The refractive index increment of the polymer/sulphuric acid (96% strength) system studied is measured in the conventional manner on a differential refractometer (DEBYE type).

EXAMPLES 1 TO 19

For all these examples, NMP containing less than 200 ppm by weight of water, and a calcium chloride which had been crystallized with 2 molecules of water and dehydrated in vacuo at 250° C. and which contained 0.2% of water, were used.

A mixer of the grooved rotor/stator type, comprising spikes and having a capacity of 26 cm$^3$ is used. The active element is a mixing turbine which rotates at 5,500 rpm.

The experiments are carried out at a flow-rate of the p-phenylenediamine solution of 1 liter/minute.

On the one hand, the molten terephthaloyl chloride kept at 100° C. and, on the other hand, a solution of p-phenylenediamine in a mixture of NMP and CaCl$_2$ in various proportions and at various temperatures, are injected simultaneously and with high precision and uniformity. The material leaving the mixer then passes into a double-screw apparatus, having a nominal capacity of 5.4 liters, in which it is further malaxated.

For the various examples, the following table indicates the concentration of polymer, expressed in % by weight relative to the NMP: PPD-T/NMP %; the CaCl$_2$ content, expressed in % by weight relative to the NMP: CaCl$_2$/NMP %; the molar ratio of CaCl$_2$/p-phenylene terephthalamide unit: $C_m$; the initial injection temperature of the diamine solution: T in °C.; and the inherent viscosity obtained: I.V.

| Example | $\frac{PPD-T}{NMP}$ % | $\frac{CaCl_2}{NMP}$ % | $C_m$ | T °C. | I.V. |
|---|---|---|---|---|---|
| 1 | 5.52 | 3.2 | 1.25 | 15 | 3.6 |
| 2 | 5.74 | 7.35 | 2.75 | 40 | 6.1 |
| 3 | 6.82 | 4.75 | 1.50 | 25 | 5.5 |
| 4 | 8.07 | 4.7 | 1.25 | 15 | 4.7 |
| 5 | 8.22 | 6.7 | 1.75 | 20 | 7 |
| 6 | 8.74 | 5.10 | 1.25 | 15 | 4.1 |
| 7 | 8.83 | 6.15 | 1.50 | 20 | 4.4 |
| 8 | 8.83 | 6.15 | 1.50 | 15 | 6.1 |
| 9 | 8.92 | 7.3 | 1.75 | 25 | 5.9 |
| 10 | 9.42 | 5.5 | 1.25 | 10 | 4.8 |
| 11 | 9.53 | 6.65 | 1.50 | 3.5 | 6.5 |
| 12 | 9.64 | 7.85 | 1.75 | 25 | 6.3 |
| 13 | 10.13 | 5.9 | 1.25 | 3.5 | 6.1 |
| 14 | 10.25 | 7.15 | 1.50 | 2.5 | 4.8 |
| 15 | 10.71 | 5 | 1 | 5 | 2.44 |
| 15 bis | 10.10 | 5.15 | 1.10 | 5 | 2.11 |
| 16 | 10.82 | 6 | 1.20 | 5 | 3.9 |
| 17 | 10.98 | 7.65 | 1.50 | 5 | 4 |
| 18* | 14.23 | 8.3 | 1.25 | 3.5 | 1.7 |
| 19* | 14.23 | 10 | 1.50 | 25 | 1.2 |

*For these two examples, the water content of the NMP was 420 ppm for Example 18 and 1,100 ppm for Example 19.

Examination of the results shown in the foregoing table shows that the comparison experiments carried out either with too low a molar ratio $C_m$ (Example 15 and 15 bis), or with a mixture of diamine, NMP and CaCl$_2$ containing too much calcium chloride and, in particular, too much water and also too much diamine (Examples 18 and 19), resulted in polymers having an inherent viscosity which was too low.

The polymer obtained in Example 5 has a molecular weight of 51,000 and that obtained in Example 11 has a molecular weight of 47,600.

EXAMPLES 20 TO 23

Example 11 was repeated with a polymer concentration, relative to the NMP, of 9.53% by weight, and a molar ratio $C_m$ of 1.50, but using solutions of p-phenylenediamine in NMP and CaCl$_2$ of different temperatures.

The following results were obtained:

| Examples | T °C. | I.V. |
|---|---|---|
| 20 | 30 | 3.7 |
| 21 | 25 | 4.5 |
| 22 | 15 | 5.7 |
| 23 | 10 | 6 |
| 11 | 3.5 | 6.5 |

It is therefore seen that, for a mean polymer concentration and a mean molar ratio of CaCl$_2$/p-phenylene terephthalamide unit, the inherent viscosity of the polymer obtained increased as the temperature is decreased.

EXAMPLES 24 TO 27

Several solutions of diamine in a mixture of NMP and CaCl$_2$ are prepared, all of which contain p-phenylenediamine and 4,4'-diaminoadipanilide in the proportion of 63/37 by weight, but using different amounts and varying the temperatures and the CaCl$_2$ content.

Each solution and the molten terephaloyl chloride at 100° C. are injected simultaneously into the same equipment as in the preceding examples.

The following results are obtained:

| Examples | 24 | 25 | 26 | 27 |
|---|---|---|---|---|
| $\frac{Copolymer}{NMP}$ % | 8.90 | 11.45 | 14.15 | 14.15 |
| CaCl$_2$/NMP % | 5.41 | 6.96 | 7.17 | 7.17 |
| $C_m = \frac{CaCl_2}{\text{mean copolymer unit}}$ | 1.29 | 1.29 | 1.075 | 1.075 |
| Water Content of the Mixture of NMP and CaCl$_2$ in ppm | 530 | 400 | 560 | 560 |
| Temperature of the Diamine Solution °C. | 25 | 25 | 25 | 9 |
| Inherent Viscosity | 4.50 | 4.65 | 1 | 3.42 |

Examples 26 and 27 show that, for a molar ratio of CaCl$_2$/mean copolymer unit of 1.075, it is still possible to obtain a copolymer having an inherent viscosity greater than 3, provided that a low temperature of the diamine solution is used.

The polymer obtained in Example 24 has a molecular weight of 69,000.

EXAMPLE 28

A mixture of terephthaloyl chloride and adipoyl chloride, in a molar proportion of 86/14 and at 100° C., and a solution of p-phenylenediamine in a mixture of NMP and CaCl$_2$ at 23° C., which is such that the CaCl$_2$ content is 5.43% by weight relative to the NMP and the molar ratio of CaCl$_2$/mean copolymer unit is 1.29, are injected simultaneously into the same reactor as in the preceding examples.

A crumbly composition is obtained, which contains 7.63% of a copolymer having an inherent viscosity of 3.72.

EXAMPLE 29

A PPD-T obtained under conditions similar to those of Example 16 has the following inherent viscosities:

By measurement in 100% strength $H_2SO_4$ at 25° C.: 3.65

By measurement in 96% strength $H_2SO_4$ at 25° C.: 3.05

By measurement in 96% strength $H_2SO_4$ at 30° C.: 2.95.

A solution containing 18.5% by weight of this polymer in pure sulphuric acid (100% strength) is extruded hot through a spinneret having 250 orifices of 60μ. The freshly extruded filaments pass through a layer of air before entering a coagulating bath kept at a low temperature. Thereafter, the yarn is neutralized, washed and then wound up at 200 m/minute. It possesses the following properties (mean of 10 measurements on a filament; length of test sample: 2.5 cm):

| | |
|---|---|
| Gauge per strand in dtex | 1.56 |
| Tenacity in cN/tex | 181 |
| Elongation % | 3.92 |
| Initial Modulus of Elasticity in cN/tex | 5360 |

This example shows that, even with a polymer which has a rather low inherent viscosity, which is prepared by the process according to the invention, it is possible to obtain a yarn having particularly good properties.

EXAMPLES 30 TO 33

The procedure of Example 1 is followed, but using a homogeneous solution which contains 8.28% by weight of $CaCl_2$ in NMP and 200 ppm of water, and which is obtained by dehydration by distillation at 130° C. under a pressure of 85 mm Hg.

For the various examples the following table indicates the polymer concentration, expressed in % by weight relative to the NMP: PPD-T/NMP %; the $CaCl_2$ content, expressed in % by weight relative to the NMP: $CaCl_2$/NMP %; the molar ratio of $CaCl_2$/p-phenylene terephthalamide unit: $C_m$; the initial injection temperature of the diamine solution: T in °C.; and the inherent viscosity obtained: I.V.

| Example | PPD-T/NMP % | CaCl$_2$/NMP % | $C_m$ | T °C. | I.V. |
|---|---|---|---|---|---|
| 30 | 6.7 | 8.28 | 2.68 | 27 | 4.45 |
| 31 | 8.35 | 8.28 | 2.13 | 25 | 4.88 |
| 32 | 9.7 | 8.28 | 1.84 | 11 | 4.54 |
| 33 | 11.1 | 8.28 | 1.61 | 5 | 4.50 |

When compared with Example 18, these examples show that it is possible to obtain good results with a large amount of $CaCl_2$, provided that the solution of diamine in the mixture of NMP and $CaCl_2$ is homogeneous; that is to say, for diamine concentrations which are not too high.

EXAMPLE 34

The procedure of the preceding examples is followed, but with a polymer concentration of 8.30% by weight relative to the NMP; a molar ratio $C_m$ of 1.85; and using a solution which has been dehydrated beforehand down to 150 ppm of water and contains 7.1% by weight of $CaCl_2$ in the NMP. The terephthaloyl chloride is at 98.3° C. and the para-phenylenediamine solution is at 20.6° C.

It is thus possible to obtain in this way a PPD-T having an inherent viscosity of 8.11.

EXAMPLES 35 TO 38

The procedure of Examples 24 to 27 is followed, the diamine solutions all containing the same proportion of 63/37 by weight of p-phenylenediamine and of 4,4'-diaminoadipanilide, but in different amounts, and the terephthaloyl chloride being molten at 98.3°-98.5° C.

The following results are obtained:

| Examples | 35 | 36 | 37 | 38 |
|---|---|---|---|---|
| Copolymer/NMP % | 10.9 | 9.6 | 8.2 | 6.3 |
| CaCl$_2$/NMP % | 6.9 | 6.9 | 6.9 | 7 |
| $C_m = \frac{CaCl_2}{\text{mean copolymer unit}}$ | 1.345 | 1.537 | 1.78 | 2.35 |
| Diamine Solution: T °C. | 25 | 24 | 24 | 48 |
| H$_2$O Content in ppm | 160 | 240 | 240 | 600 |
| Inherent Viscosity | 5.27 | 5.20 | 5.17 | 4.69 |

Such inherent viscosities are particularly high for a copolymer which generally has a lower inherent viscosity than that of PPD-T.

EXAMPLES 39 AND 40

25.6 parts of adipoyl chloride are added, in the course of 1 hour and 30 minutes, to a reactor which contains a solution of 108.1 parts of para-phenylenediamine in a mixture, at 30° C. of NMP and $CaCl_2$ containing 7.1% of $CaCl_2$ and 150 ppm of water. The prepolymer solution obtained is kept at 30° C. for 3 hours (Example 39) or 24 hours (Example 40).

A stoichiometric amount of this solution is then injected simultaneously with molten terephthaloyl chloride, at 98° C., into a reactor which is similar to that of Example 1 but which has a capacity of 50 cm$^3$.

The conditions then are as follows:

| Example | 39 | 40 |
|---|---|---|
| Copolymer/NMP % | 9.6 | 9.6 |
| $C_m = \frac{CaCl_2}{\text{mean copolymer unit}}$ % | 1.58 | 1.58 |
| Injection Temperature of the Solution of Prepolymer and of Diamine | 30° C. | 30° C. |
| Inherent Viscosity of the Copolymer Obtained | 6.47 | 6.14 |

These viscosities are completely remarkable for a copolymer.

EXAMPLE 41

Example 39 is repeated, but the adipoyl chloride is added all at once to the reactor which contains the solution of para-phenylenediamine in the mixture of NMP and $CaCl_2$ (containing 500 ppm of water).

An inherent viscosity of 3.66 is then obtained.

EXAMPLES 42 TO 46

A solution of para-phenylenediamine in various mixtures of NMP and $CaCl_2$ is prepared and, in accordance with the various examples as indicated below, different amounts of adipoyl chloride are then added all at once, in order to form a solution of a prepolymer having adipic blocks.

A stoichiometric amount of this solution is then injected simultaneously with molten terephthaloyl chloride into the same reactor as in Example 39.

The operating conditions and the inherent viscosity of the polymers thus obtained are as follows:

| Example | 42 | 43 | 44 | 45 | 46 |
|---|---|---|---|---|---|
| Butylene Segments in % of R | 14 | 14 | 20 | 24 | 24 |
| Copolymer/NMP % | 5.7 | 6.9 | 5.5 | 9.5 | 8.19 |
| CaCl$_2$/NMP % | 6.10 | 6.47 | 3.2 | 6.29 | 6.27 |
| $C_m = \dfrac{CaCl_2}{\text{mean copolymer unit}}$ | 2.42 | 1.99 | 1.24 | 1.39 | 1.61 |
| Temperature of Terephthaloyl Chloride | 98.4 | 98.2 | 98.2 | 98.1 | 110 |
| Temperature of Prepolymer Solution | 40 | 70 | 59.8 | 49.8 | 40 |
| Inherent Viscosity | 4.16 | 4.09 | 4.08 | 3.44 | 6.3 |

What is claimed is:

1. A process for the continuous production of a spinnable polyamide-containing composition consisting of repeating units of the generic formula:

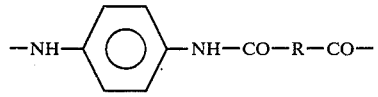

in which 50 to 100% of the radicals R are p-phenylene radicals and the remaining 0 to 50% of the radicals R consist essentially of n-butylene radicals, which polyamide has a fiber-forming viscosity, measured at 25° C. on a solution in 100% strength sulphuric acid which has a concentration of 0.5 g of polymer in 100 ml of solvent, characterized in that (a) molten terephthaloyl chloride, or (b) molten terephthaloyl chloride in admixture with adipoyl chloride, is reacted continuously with a solution of (c) para-phenylenediamine, or (d) 4,4'-diaminoadipanilide, or (e) a mixture of (c) and (d), or (f) a mixture of (c) and (g) a prepolymer formed from at least one chloride and at least one diamine from amongst those mentioned above, or (d) in admixture with (g), or (e) in admixture with (g), in a mixture of N-methylpyrrolidone-2 and calcium chloride, under conditions such that: the acid chloride or chlorides and the diamine or diamines are in essentially stoichiometric proportions; the solution of diamine or diamines, and when present the prepolymer, in the mixture of N-methylpyrrolidone-2 and calcium chloride, is homogeneous and substantially anhydrous; with the CaCl$_2$ being in and remaining in solution at the time of its use; the molar ratio of calcium chloride to the number of units:

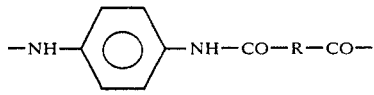

is at least 1; and the relative amounts of reactants and solvents are chosen such that, at the end of the reaction, the resulting polymer-containing composition contains at least 5% by weight of polyamide, relative to the N-methylpyrrolidone-2.

2. A process according to claim 1, in which the solution of the diamine or diamines, and of the prepolymer when present, has a water content which does not exceed 1,500 ppm, and preferably 500 ppm, by weight.

3. A process according to claim 1, in which the temperature of the dichloride is between 60° and 120° C.

4. A process according to claim 1, in which the temperature of the terephthaloyl dichloride is between 85° and 120° C.

5. A process according to claim 1, in which the temperature of the solution of diamine or diamines, and of the prepolymer when present, is less than 50° C.

6. A process according to claim 1, in which a p-phenylene terephthalamide/adipamide copolymer is prepared.

7. A process according to claim 1, in which a poly-(p-phenylene terephthalamide) is prepared, and in which the molar ratio of calcium chloride to the number of p-phenylene terephthalamide units is at least 1.15.

8. A process according to claim 6 or claim 7, in which the molar ratio of calcium chloride to the number of units:

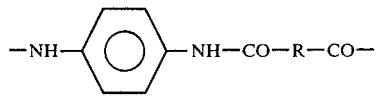

is between 1.25 and 2.75.

* * * * *